US012726448B2

(12) United States Patent
Patronas et al.

(10) Patent No.: US 12,726,448 B2
(45) Date of Patent: Sep. 1, 2026

(54) SYSTEM FOR ALLOCATION OF NETWORK RESOURCES FOR EXECUTING LARGE LANGUAGE MODEL (LLM) TASKS

(71) Applicant: Mellanox Technologes, Ltd., Yokneam (IL)

(72) Inventors: Ioannis (Giannis) Patronas, Piraeus (GR); Nikolaos Terzenidis, Kilkis (GR); Eitan Zahavi, Zichron Yaakov (IL); Paraskevas Bakopoulos, Ilion (GR); Zsolt-Alon Wertheimer, Kiryat Ata (IL); Dimitrios Syrivelis, Volos (GR); Prethvi Ramesh Kashinkunti, Chicago, IL (US); Louis Bennie Capps, Jr., Georgetown, TX (US); Julie Irene Marcelle Bernauer, Palo Alto, CA (US); Elad Mentovich, Tel Aviv (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 18/416,028

(22) Filed: Jan. 18, 2024

(65) Prior Publication Data

US 2025/0211548 A1 Jun. 26, 2025

(30) Foreign Application Priority Data

Dec. 20, 2023 (GR) .............................. 20230101059

(51) Int. Cl.

| | |
|---|---|
| ***H04L 47/80*** | (2022.01) |
| ***H04L 47/70*** | (2022.01) |
| ***H04L 47/78*** | (2022.01) |

(52) U.S. Cl.
CPC .......... *H04L 47/808* (2013.01); *H04L 47/781* (2013.01); *H04L 47/827* (2013.01)

(58) Field of Classification Search
CPC .... H04L 47/808; H04L 47/781; H04L 47/827
(Continued)

(56) References Cited

U.S. PATENT DOCUMENTS 9,419,902 B1 8/2016 Sites
9,755,948 B1 9/2017 Viljoen
(Continued)

OTHER PUBLICATIONS

Urman et al., Pending U.S. Appl. No. 18/242,637, filed Sep. 6, 2023.
(Continued)

*Primary Examiner* — Suraj M Joshi
*Assistant Examiner* — Ayele F Woldemariam
(74) *Attorney, Agent, or Firm* — Alston & Bird LLP

(57) ABSTRACT

Systems, computer program products, and methods are described herein for allocation of network resources for executing large language model (LLM) tasks. An example system receives an LLM task and an input specifying information associated with execution of the LLM task, wherein the input comprises at least a parallelism parameter and a communication pattern; determines a plurality of hosts based on at least the parallelism parameter and the communication pattern; determines a plurality of switches based on the plurality of hosts; operatively couples the plurality of hosts to the plurality of switches to configure a network point of delivery (POD); and triggers execution of the LLM task using the network POD.

22 Claims, 7 Drawing Sheets

(58) Field of Classification Search
USPC .......................................................... 709/226
See application file for complete search history.

(56) References Cited

U.S. PATENT DOCUMENTS 9,929,933 B1 3/2018 Viljoen
10,129,135 B1 11/2018 Viljoen
10,637,685 B2 4/2020 Goel et al.
10,664,438 B2 5/2020 Sity et al.
10,686,729 B2 6/2020 Sindhu et al.
11,057,301 B2 7/2021 Thubert et al.
11,171,882 B2 11/2021 Levy et al.
11,350,189 B2 5/2022 Bakopoulos et al.
11,615,285 B2 3/2023 Reimann et al.
11,797,353 B2 10/2023 Abdulaal et al.
12,086,080 B2 9/2024 Chrysos et al.
12,175,375 B2 12/2024 Kapoor et al.
12,176,945 B2 12/2024 Bakopoulos et al.
12,177,133 B2 12/2024 Morrison et al.
12,189,570 B2 1/2025 Du et al.
12,190,084 B2 1/2025 Prabhakar et al.
2004/0098104 A1 5/2004 Sirhan et al.
2006/0165070 A1 7/2006 Hall et al.
2008/0138067 A1 6/2008 Beshai
2011/0270987 A1 11/2011 Schlansker et al.
2014/0211622 A1 7/2014 Kumer et al.
2015/0043905 A1 2/2015 Graves et al.
2015/0074246 A1 3/2015 Premji et al.
2015/0127797 A1 5/2015 Attar et al.
2016/0044393 A1* 2/2016 Graves .................. H04L 47/125
398/51
2016/0241491 A1 8/2016 Tripathi et al.
2016/0316005 A1 10/2016 Thirumurthi et al.
2016/0352824 A1 12/2016 Miwa et al.
2016/0380886 A1 12/2016 Blair et al.
2017/0063613 A1* 3/2017 Bloch ..................... H04L 12/44
2017/0187607 A1 6/2017 Shaikh et al.
2017/0212918 A1 7/2017 Johnsen et al.
2017/0272355 A1 9/2017 Shimizu et al.
2017/0279690 A1 9/2017 Tripathi et al.
2017/0294961 A1 10/2017 Anand et al.
2018/0070157 A1 3/2018 Menard et al.
2018/0227169 A1 8/2018 Nakashima
2018/0322387 A1* 11/2018 Sridharan ............... G06F 9/547
2019/0080239 A1 3/2019 Yang
2019/0123961 A1 4/2019 Fedyk
2019/0165997 A1 5/2019 Shaikh et al.
2019/0166013 A1 5/2019 Shaikh et al.
2019/0245751 A1 8/2019 Wong
2019/0246187 A1 8/2019 Wong
2019/0260658 A1 8/2019 Gell et al.
2019/0294972 A1 9/2019 Keller et al.
2019/0312772 A1 10/2019 Zhao et al.
2019/0324811 A1 10/2019 Ganguli et al.
2019/0379477 A1 12/2019 Tien et al.
2020/0028774 A1 1/2020 Pathikonda et al.
2020/0259740 A1 8/2020 Wetterwald et al.
2020/0259746 A1 8/2020 Thubert et al.
2020/0304406 A1 9/2020 Thubert et al.
2020/0344155 A1 10/2020 Chhibber et al.
2020/0403923 A1 12/2020 Attar et al.
2021/0076112 A1 3/2021 Hand
2021/0097378 A1 4/2021 Rodrigues et al.
2021/0149918 A1 5/2021 Finkler
2021/0152494 A1 5/2021 Johnsen et al.
2021/0234753 A1* 7/2021 Ben-Moshe .......... H04L 69/324
2022/0004897 A1 1/2022 Jadon et al.
2022/0014828 A1 1/2022 Bakopoulos et al.
2022/0103480 A1 3/2022 Chiesa et al.
2022/0124548 A1 4/2022 Srivastava et al.
2022/0164297 A1 5/2022 Sity et al.
2022/0172072 A1 6/2022 Keller et al.
2022/0210058 A1* 6/2022 Bataineh ................. H04L 47/26
2022/0284294 A1 9/2022 Keller et al.
2022/0393974 A1 12/2022 Wen et al.
2023/0208915 A1* 6/2023 Duan ................ G06F 15/17318
709/219
2023/0334292 A1 10/2023 Zhang et al.
2023/0336414 A1 10/2023 Miriyala et al.
2023/0412265 A1 12/2023 Bakopoulos et al.
2024/0020265 A1 1/2024 Fu et al.
2024/0037063 A1 2/2024 Suh et al.
2024/0098088 A1 3/2024 Adogla et al.
2024/0098104 A1 3/2024 Patronas et al.
2024/0113943 A1 4/2024 Patronas et al.
2024/0119267 A1 4/2024 Kierat et al.
2024/0121158 A1 4/2024 Bakopoulos et al.
2024/0129161 A1 4/2024 Miriyala et al.
2024/0152396 A1 5/2024 Brar et al.
2024/0152409 A1 5/2024 Brar et al.
2024/0160495 A1 5/2024 Brar et al.
2024/0160496 A1 5/2024 Brar et al.
2024/0160691 A1* 5/2024 Kim ........................ G06F 17/16
2024/0185048 A1 6/2024 Sebastian et al.
2024/0214294 A1 6/2024 Miriyala et al.
2024/0314197 A1 9/2024 Qu
2024/0406072 A1* 12/2024 Bhardwaj ............... H04L 45/02
2025/0181358 A1* 6/2025 Bilal ................... G06F 9/44505

OTHER PUBLICATIONS

Patronas et al., Pending U.S. Appl. No. 18/427,046, filed Jan. 30, 2024.

Patronas et al., Pending U.S. Appl. No. 18/415,878, filed Jan. 18, 2024.

* cited by examiner

RECEIVING AN LLM TASK AND AN INPUT SPECIFYING INFORMATION ASSOCIATED WITH EXECUTION OF THE LLM TASK, WHEREIN THE INPUT COMPRISES AT LEAST A PARALLELISM PARAMETER AND A COMMUNICATION PATTERN
402

DETERMINING A PLURALITY OF HOSTS BASED ON AT LEAST THE PARALLELISM PARAMETER AND THE COMMUNICATION PATTERN
404

DETERMINING A PLURALITY OF SWITCHES BASED ON THE PLURALITY OF HOSTS
406

OPERATIVELY COUPLING THE PLURALITY OF HOSTS TO THE PLURALITY OF SWITCHES TO CONFIGURE A NETWORK POINT OF DELIVERY (POD)
408

TRIGGERING EXECUTION OF THE LLM TASK USING THE NETWORK POD
410

FIG. 5

SYSTEM FOR ALLOCATION OF NETWORK RESOURCES FOR EXECUTING LARGE LANGUAGE MODEL (LLM) TASKS

CROSS-REFERENCE TO RELATED APPLICATIONS

This application claims priority to Greek patent application No. 20230101059, filed Dec. 20, 2023, the entire contents of which application are hereby incorporated herein by reference.

TECHNOLOGICAL FIELD

Example embodiments of the present invention relate to network communications and, more particularly, to efficient resource utilization and adaptability in distributed computing environments.

BACKGROUND

In the field of distributed computing, the demand for high-performance data exchange has risen significantly, especially in applications such as deep learning. Traditional network architectures are often constructed around static topologies, which may be suboptimal for handling the intricacies of modern computational demands. In the field of machine learning, there is a growing need for a solution capable of facilitating efficient data exchange for the execution of computationally intensive tasks.

Applicant has identified a number of deficiencies and problems associated with conventional network systems and associated communications. Many of these identified problems have been solved by developing solutions that are included in embodiments of the present disclosure, many examples of which are described in detail herein.

BRIEF SUMMARY

Systems, methods, and computer program products are therefore provided for allocation of network resources for executing computationally intensive machine learning tasks in a dynamic, structured hierarchical network.

In one aspect, a method for allocation of network resources for executing large language model (LLM) tasks is presented. The method comprising: receiving an LLM task and an input specifying information associated with execution of the LLM task, wherein the input comprises at least a parallelism parameter and a communication pattern; determining a plurality of hosts based on at least the parallelism parameter and the communication pattern; determining a plurality of switches based on the plurality of hosts; operatively coupling the plurality of hosts to the plurality of switches to dynamically configure a network point of delivery (POD); and triggering execution of the LLM task using the network POD.

In some embodiments, the parallelism parameter comprises at least one of a data parallelism parameter or a pipeline parallelism parameter, wherein the data parallelism parameter indicates a number of pipelines for executing the LLM task, wherein each pipeline represents a data partition, wherein the pipeline parallelism parameter indicates a number of pipeline stages for each pipeline, wherein each pipeline stage represents a portion of the corresponding data partition.

In some embodiments, segmenting the execution of the LLM task into a plurality of pipelines based on the data parallelism parameter; segmenting each pipeline into a plurality of pipeline stages based on the pipeline parallelism parameter; and allocating the plurality of pipelines and the plurality of pipeline stages among the plurality of hosts.

In some embodiments, wherein the plurality of hosts is interconnected for data portion communication and pipeline communication, wherein the data portion communication is based on the communication pattern associated with the data parallelism parameter and the pipeline communication is based on the communication pattern associated with the pipeline parallelism parameter.

In some embodiments, determining a first set of optical circuit connections for each switch to facilitate the data portion communication between the plurality of hosts across the plurality of switches; determining a second set of optical circuit connections for each switch to facilitate the pipeline communication between the plurality of hosts across the plurality of switches; and operatively coupling the plurality of switches using the first set of optical circuit connections and the second set of optical circuit connections.

In some embodiments, a count of the first set of optical circuit connections and a count of the second set of optical circuit connections is determined to satisfy a specific bandwidth requirement.

In some embodiments, in instances in which the specific bandwidth requirement is a full-bisection bandwidth requirement, the count of the first set of optical circuit connections is greater than or equal to 2*ps*k, wherein ps is number of pipeline stages allocated to a subset of the plurality of hosts that are operatively coupled to each switch, wherein k is a fractional bandwidth requirement for each data portion communication in each direction relative to a total bandwidth of an optical circuit connection in the first set of optical circuit connections, and the count of the second set of optical circuit connections is greater than or equal to 2*p*m, wherein p is the number of pipelines allocated to the subset of the plurality of hosts that are operatively coupled to each switch, and wherein m is a fractional bandwidth requirement for each pipeline communication in each direction relative to a total bandwidth of an optical circuit connection in the second set of optical circuit connections.

In some embodiments, the plurality of hosts is operatively coupled to the same switch.

In some embodiments, the communication pattern associated with the pipeline parallelism parameter comprises at least a point-to-point communication, and wherein the communication pattern associated with the data parallelism parameter comprises at least a reduction operation.

In some embodiments, the network POD is configured based on a closed loop topology to allow the plurality of hosts to communicate with one another via the plurality of switches, wherein the closed loop topology comprises at least one of a ring topology or a torus topology.

In some embodiments, the network POD is configured based on an in-network collective, wherein the in-network collective comprises at least a scalable hierarchical aggregation and reduction protocol (SHARP) model in which the network POD is configured by allocating a plurality of circuits from each switch such that an aggregate count of the plurality of switches is equal to an aggregate count of distinct reductions associated with the switch, thereby ensuring full bandwidth utilization, and constructing a network topology that includes designated root switches for facilitating the reductions.

In some embodiments, configuring a network structure with a plurality of network PODs; determining a plurality of spine switches based on at least the plurality of network PODs; interconnecting the plurality of network PODs via the plurality of spine switches; and triggering the execution of the LLM task using the network structure.

In another aspect, a system for allocation of network resources for executing large language model (LLM) tasks is presented. The system comprising: a processing device; a non-transitory storage device containing instructions that, when executed by the processing device, cause the processing device to: receive an LLM task and an input specifying information associated with execution of the LLM task, wherein the input comprises at least a parallelism parameter and a communication pattern; determine a plurality of hosts based on at least the parallelism parameter and the communication pattern; determine a plurality of switches based on the plurality of hosts; operatively couple the plurality of hosts to the plurality of switches to dynamically configure a network POD; and trigger execution of the LLM task using the network POD.

In yet another aspect, a computer program product for allocation of network resources for executing large language model (LLM) tasks is presented. The computer program product comprising a non-transitory computer-readable medium comprising code configured to cause an apparatus to: receive an LLM task and an input specifying information associated with execution of the LLM task, wherein the input comprises at least a parallelism parameter and a communication pattern; determine a plurality of hosts based on at least the parallelism parameter and the communication pattern; determine a plurality of switches based on the plurality of hosts; operatively couple the plurality of hosts to the plurality of switches to dynamically configure a network POD; and trigger execution of the LLM task using the network POD.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 5 illustrates an example method for allocation of network resources for executing LLM tasks, in accordance with an embodiment of the present disclosure.

DETAILED DESCRIPTION

Overview

Figure 1A:
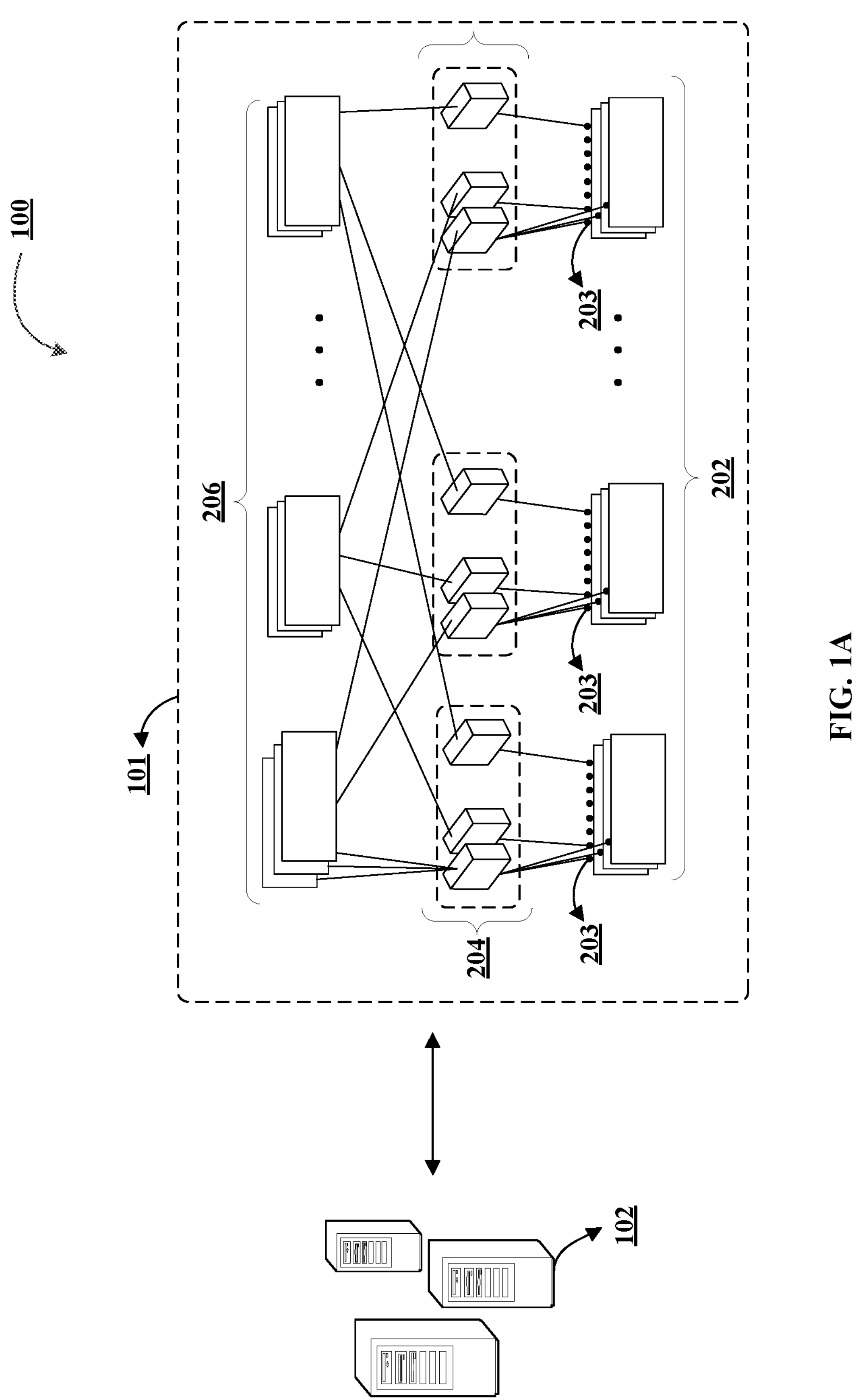
FIGS. 1A and 1B illustrate example network environments for allocation of network resources for executing LLM tasks, in accordance with an embodiment of the present disclosure.

In the realm of distributed computing, the increasing demand for high-performance data exchange (e.g., in deep learning applications) presents significant challenges. Traditional network architectures, anchored around static topologies with spine and leaf switches, often grapple with network congestion and latency. These challenges stem primarily from the simultaneous communications occurring between multiple servers. Furthermore, these static designs lack the adaptability to efficiently accommodate the diverse requirements of different tasks or applications. This rigidity can lead to two major pitfalls: overprovisioning, which results in resource wastage, and under provisioning, which causes performance bottlenecks. To address these concerns, a dynamic, structured hierarchical network is introduced.

At the foundation of this dynamic, structured hierarchical network are the hosts. A host may be a single computational unit, equipped with the capability to independently execute parts of the task. Alternatively, a host may be a cluster of computational units interconnected via an internal network, functioning collectively as a single entity. More specifically, a host may include multiple computational units that may be tightly interconnected (e.g., using high bandwidth and low latency links) via a parallel switched (e.g., electrically switched) internal network. Such a tight interconnection may ensure that data transfer between the computational units within the host may happen with minimal delay and maximum throughput, as if the separate computational units are functioning as a single, cohesive system. In this clustered configuration, the host, as the single entity, may independently execute parts of the task, leveraging the interconnected nature of its multiple computational units.

Each host may be equipped with ports. These ports may provide the primary interface for the servers to connect with the network. Every port from a host may be directly coupled to a port on a switch (e.g., leaf switch), serving as the first layer of network distribution. These switches may further be coupled to other switches (e.g., spine switches), serving as the second layer of network distribution. Subsequently, these switches interface with optical switches which, in turn, may facilitate data communication among various hosts through the coupled switches. The coupling between the switches and the optical switches can be established in a one-to-one manner, or the coupling can be bundled together for increased capacity and flexibility. By leveraging optical switches, the architecture may benefit from rapid data transfer rates, reduced latency, and the ability to dynamically reconfigure the network as needed. According to embodiments of the invention described herein, this multi-tiered approach ensures efficient resource utilization, scalability, and a high degree of adaptability to various computational demands.

Embodiments of the invention relate to dynamic allocation of network resources in the structured hierarchical network for a large language model (LLM) task. Large Language Models (LLMs) are a category of machine learning models designed to process and generate human-like text based on a given input. Commonly utilized in numerous domains such as natural language processing, translation, and summarization, these models are capable of comprehending and generating text in a coherent and contextually relevant manner. LLMs operate by analyzing vast quantities of text data to learn linguistic patterns, semantics, and the contextual relevance of words and phrases.

The performance and capability of LLMs are heavily dependent on the amount and quality of training data the LLMs are exposed to. Typically, LLMs are trained on extensive datasets comprising a wide array of text data. The training process of LLMs is computationally demanding due to the large size of the model parameters and the necessity for processing substantial volumes of data. This computational demand is a result of the intricate architecture inherent to LLMs, which often includes multiple layers of transformer blocks. Each layer consists of self-attention mechanisms and feed-forward neural networks that work in tandem to process and generate text.

The training of LLMs not only requires substantial computational resources but also benefits significantly from the efficient allocation and utilization of network resources, especially in distributed training settings. Transmitting large datasets over a network and coordinating the training process across multiple computational nodes necessitates high bandwidth and low-latency connections. Any impediment to data flow or network communication can adversely affect the model's training convergence and overall efficiency. Given the extensive size and complexity of LLMs, particularly when trained on large-scale datasets, the allocation of adequate computational and network resources is crucial to prevent prolonged training durations and to ensure optimal model performance.

To manage the computational demands, techniques such as parallelism are often employed. Parallelism facilitates the efficient processing of large datasets and complex computations, thus promoting optimal resource utilization and cost-effectiveness. Embodiments of the invention process the LLM task using pipeline parallelism, data parallelism, and/or tensor parallelism. In this regard, an incoming LLM task may be accompanied by an input that specifies a parallelism parameter and a communication pattern. The parallelism parameter may include a data parallelism parameter that may indicate a number of data partitions for executing the LLM task, where each data partition is processed by a pipeline, thus allowing for multiple pipelines to execute the LLM task concurrently. The communication pattern may be specific to the data parallelism parameter. For instance, the communication pattern for data parallelism may be collective operations such as a reduction operation among all parallel units (e.g., hosts), facilitating synchronization and aggregation of results from each data partition. The parallelism parameter may also include a pipeline parallelism parameter indicating a number of pipeline stages for each pipeline for distributed processing of a corresponding data partition. Here, each pipeline stage may represent a portion of the corresponding data partition. The communication pattern for pipeline parallelism may include point-to-point interactions between sequential stages of the pipeline. The parallelism parameter may also include a tensor parallelism parameter indicating a number of computation units to distribute the computations involved in processing multi-dimensional data structures involved in the execution of the LLM task. The tensor parallelism may be managed by a small subset of tightly interconnected hosts, organized in domains, or, in cases where each host is in a clustered configuration with multiple computational units interconnected via a parallel switched network, within each host/domain.

Upon receiving the parallelism parameter and the communication pattern, embodiments of the invention may determine a plurality of hosts and a plurality of switches (e.g., electrical switches such as leaf switches, spine switches, and/or the like) to dynamically configure a network point of delivery (POD) to execute the LLM task. In specific embodiments, a count of the plurality of hosts may be determined based on the parallelism parameters. For example, in cases where the parallelism parameters include data parallelism parameters, pipeline parallelism parameters, and tensor parallelism parameters, the count of the plurality of hosts may be determined as a product of the number of pipelines as defined by the data parallelism parameter, number of stages per pipeline as defined by the pipeline parallelism parameter, and a number of computation units involved in processing multi-dimensional data structures as defined by the tensor parallelism parameter.

The LLM task may executed by a single network POD, or, depending on the computation requirement, by a cluster of network PODs interconnected via switches (e.g., electrical switches such as leaf switches, spine switches, and/or the like). In some embodiments, the network POD may be configured based on a closed loop topology (e.g., ring topology, torus topology, and/or the like) to allow the plurality of hosts to communicate with one another via the plurality of switches. In some other embodiments, the network POD may be configured based on an in-network collective such as a scalable hierarchical aggregation and reduction protocol (SHARP) model. In the SHARP model, the plurality of hosts are configured to communicate with a root switch that acts as a central aggregation point for all data communications within the network POD, receiving, processing, and directing data from the plurality of hosts via the plurality of switches.

Based on the data parallelism parameter, the execution of the LLM task may be segmented into a plurality of pipelines. Based on the pipeline parallelism parameter, each pipeline may be segmented into a plurality of pipeline stages. The pipelines and their corresponding pipeline stages may be allocated to various hosts within the network POD. These hosts may either be operatively coupled to a single switch (e.g., leaf switch), or distributed across multiple switches. In instances in which the hosts are operatively coupled to a single switch, each host assigned to process a particular pipeline stage of a given pipeline may be operatively coupled to another host that is assigned to process the corresponding pipeline stage of the subsequent pipeline for data portion communication. Here, the data portion communication may be based on the communication pattern associated with the data parallelism parameter. Similarly, within each pipeline, each host that is assigned to process a pipeline stage may be operatively coupled to another host that is assigned to process the next sequential pipeline stage for pipeline communication. Here, the pipeline communication may be based on the communication pattern associated with the pipeline parallelism parameter. In instances in which the hosts are distributed across multiple switches, embodiments of the invention may determine a set of optical circuit connections for each switch to facilitate data portion communication between the hosts across the switches and set of optical circuit connections for each switch for pipeline communication between the hosts across the switches.

In a first example, the input specifying information associated with the execution of the LLM task includes a data parallelism parameter indicating 32 pipelines and a pipeline parallelism parameter indicating 8 stages per pipeline. Each switch in the network POD may be equipped with 64 ports, of which 32 are dedicated to optical circuit connections for inter-switch connectivity via optical switches. The remaining 32 ports are designated for connecting the hosts to the switch. For optimal performance, all pipeline stages for each pipeline are distributed across hosts that are operatively coupled to a single switch. Given this example configuration, a total of 4 pipelines may be allocated under each of the 8 switches in the network POD, thus accounting for all 32 pipelines. These switches are operatively coupled to one another in a closed loop topology, where each switch is operatively coupled to another switch on either side using optical circuit connections. Because all eight pipeline stages for each pipeline are distributed across hosts that are operatively coupled to a single switch, there is no need for pipeline communication across switches. However, the distribution of the 32 pipelines across 8 switches, with 4 pipelines under each switch, necessitates data portion communication between the switches. This is particularly relevant in the closed loop topology, where each switch is operatively coupled to adjacent switches. To facilitate data portion communication, optical circuit connections are employed. The determination of the number of optical circuit connections for each switch for data portion communication with adjacent switches on either side is contingent upon the specific bandwidth requirements of the network POD. In scenarios where the network POD demands full bisection bandwidth and the reductions are implemented using a simple ring communication pattern, the number of optical circuit connections for each switch must be equal to or greater than twice the number of different pipeline stages hosted in the hosts of the switch (members of different reductions. Consequently, the number of optical circuit connections for each switch in this example is 16, with 8 optical circuit connections used for data portion communication with the switch on one side and 8 optical circuit connections used for data portion communication with the switch on the other side.

In a second example, the input specifying information associated with the execution of the LLM task includes a data parallelism parameter indicating 32 pipelines and a pipeline parallelism parameter indicating 16 stages per pipeline. Due to port constraints of the switches, the pipeline stages for each pipeline are distributed across hosts operatively coupled to a pair of switches, with 8 pipeline stages distributed across 8 hosts under one switch and 8 remaining pipeline stages distributed across 8 hosts under another switch. Given this example configuration, a total of 4 pipelines may be allocated under each of the 8 pairs of switches in the network POD, thus accounting for all 32 pipelines. These pairs of switches are operatively coupled to one another in a closed loop topology, where each pair of switches is operatively coupled to another pair of switches on either side using optical circuit connections. The distribution of the 16 pipeline stages across the pair of switches necessitates pipeline communication between the pair of switches. To facilitate pipeline communication, optical circuit connections are employed. The determination of the number of optical circuit connections for each switch for pipeline communication with its corresponding switch pair is twice the total number of pipelines under the switch, to provide full bandwidth given that every pipeline requires two links (one for each direction) for its communication in the worst case. Here, since each switch in the switch pair has 4 pipelines, the total number of optical circuit connections for pipeline communication is 8. In addition, the distribution of the 32 pipelines across 8 pairs of switches, with 4 pipelines under each switch pair, necessitates data portion communication between the pairs of switches. The determination of the number of optical circuit connections for each switch in the switch pair for data portion communication with adjacent pairs of switches on either side is contingent upon the specific bandwidth requirements of the network POD. In scenarios where the network POD demands full bisection bandwidth, the number of optical circuit connections for each switch in the switch pair for data portion communication with adjacent pairs of switches on either side must be equal to or greater than twice the number of pipeline stages per pipeline. Consequently, the number of optical circuit connections for each switch in the switch pair is 16, with 8 optical circuit connections used for data portion communication with the switch pair on one side and 8 optical circuit connections used for data portion communication with the switch pair on the other side.

Once the network POD is configured, embodiments of the invention may trigger execution of the LLM task using the network POD. In embodiments where the computation requirements of the LLM task necessitates the use of an interconnected cluster of network PODs, embodiments of the invention may trigger the execution of the LLM task using the interconnected cluster of network PODs.

While the embodiments herein primarily describe configurations where hosts within the network POD may either be operatively coupled to a single switch or distributed across multiple switches, it is to be understood that these embodiments are not limiting. In addition to these configurations, the hosts may also be connected to a single, tightly interconnected switch group, facilitated by a parallel switched internal network, or distributed across multiple such tightly interconnected switch groups. The term 'tightly interconnected' may refer to a network configuration where the switches within a group are connected with high bandwidth and low latency links, enabling efficient and rapid data communication. Accordingly, the scope of the present invention should not be limited to the specific configurations described but should be understood to encompass all variations, modifications, and alternatives that fall within the spirit and broad scope of the claims.

While the present disclosure has been predominantly described with reference to certain embodiments tailored to deep learning tasks, such as LLMs, it should be understood that the scope of the invention is not confined to these specific embodiments. The invention is intended to cover any models that possess a similar structure or function to LLMs, encompassing various modifications, adaptations, and equivalent arrangements within its breadth. Accordingly, the description provided herein is meant to be exemplary rather than limiting, with the intention that the claims of the invention are applicable to other models and tasks that demonstrate analogous network resource allocation and management requirements as those detailed for LLMs.

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, "operatively coupled" may mean that the components are electronically or optically coupled and/or are in electrical or optical communication with one another. Furthermore, "operatively coupled" may mean that the components may be formed integrally with each other or may be formed separately and coupled together. Furthermore, "operatively coupled" may mean that the components may be directly connected to each other or may be connected to each other with one or more components (e.g., connectors) located between the components that are operatively coupled together. Furthermore, "operatively coupled" may mean that the components are detachable from each other or that they are permanently coupled together.

As used herein, "interconnected" may imply that each component is directly or indirectly linked to every other component or switch in the network, allowing for seamless data transfer and communication between all the components.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, satisfied, etc.

It should be understood that the word "exemplary" is used herein to mean "serving as an example, instance, or illustration." Any implementation described herein as "exemplary" is not necessarily to be construed as advantageous over other implementations.

Furthermore, as would be evident to one of ordinary skill in the art in light of the present disclosure, the terms "substantially" and "approximately" indicate that the referenced element or associated description is accurate to within applicable engineering tolerances.

Example Network Environment

FIG. 1A illustrates an example network environment 100 for allocation of network resources for executing LLM tasks, in accordance with an embodiment of the present disclosure. As shown in FIG. 1A, the network environment 100 may include a system 102 and a network point-of-delivery (POD) 101. A network POD 101 may be an adaptable network structure that can be dynamically configured and/or reconfigured to support the execution of tasks (e.g., LLM task), particularly those requiring substantial computational resources. The network POD 101 may include a plurality of hosts 202, a plurality of leaf switches 204, and a plurality of optical switches 206. As described herein, the configuration of the network POD 101 may be predicated upon the specific parameters and requirements of the LLM task, including but not limited to, parallelism parameters, communication patterns, and other task-specific demands.

Figure 2:
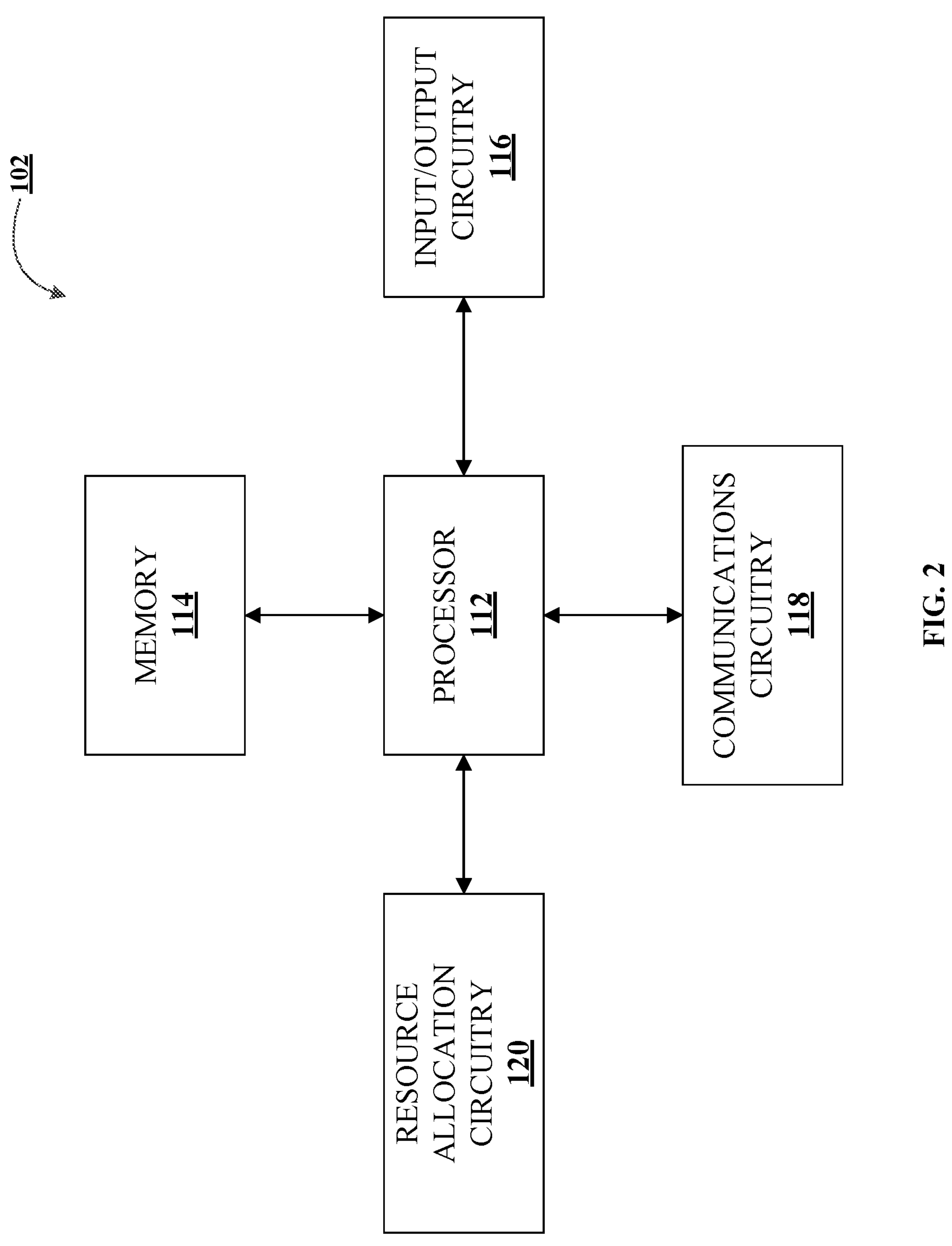
FIG. 2 illustrates an example system circuitry for allocation of network resources for executing LLM tasks, in accordance with an embodiment of the present disclosure.

As shown in FIG. 1A, the network environment 100 may include a system 102, described in further detail in FIG. 2. The system 102 may communicate with one or more components (e.g., the plurality of hosts 202) associated with the network environment 100 to execute embodiments of the invention described herein. The system 102 may be implemented in a number of different forms. For example, the system 102 may be implemented as a standard server, or multiple times in a group of such servers. Additionally, the system 102 may also be implemented as part of a rack server system or a personal computer such as a laptop computer. Alternatively, components from the system 102 may be combined with one or more other same or similar systems, and an entire system 102 may be made up of multiple computing devices communicating with each other. The system 102 may represent various forms of servers, such as web servers, database servers, file servers, or the like, various forms of digital computing devices, such as laptops, desktops, workstations, or the like, or any other auxiliary network devices, Internet-of-things devices, electronic kiosk devices, mainframes, or the like, or any combination of the aforementioned.

As shown in FIG. 1A, the network environment 100 may include a network POD 101. The network POD 101 may include a plurality of hosts 202, a plurality of leaf switches 204, and a plurality of optical switches 206. As described herein, a host may be a single computational unit, or a cluster of computational units interconnected via an internal network, functioning collectively as a single entity, configured to perform computational tasks (e.g., LLM tasks) and facilitate data exchange within the network POD. Each host may be equipped with ports 203 that may serve as a primary means of connection to the network. Each host may be operatively coupled to a leaf switch 204. In example embodiments, the coupling is achieved via optical or electrical cables, employing protocols such as Ethernet, Infiniband, NVLink, Transport Control Protocol (TCP)/Internet Protocol (IP), and/or the like for communication.

As shown in FIG. 1A, the network POD 101 may include a plurality of leaf switches 204. According to specific embodiments of the invention, leaf switches serve as the primary layer of network distribution within the network POD, acting as an intermediary, interconnecting the hosts 202. In embodiments where the hosts are in an interconnected clustered configuration, the leaf switches may act as intermediary between the computational units across the hosts 202 such that each computation unit in a particular host may be connected to a corresponding computational unit in another host. Each leaf switch 204 may include a plurality of uplink ports. These uplink ports may be configured to operatively couple the leaf switches 204 to the plurality of optical switches 206. Additionally, each leaf switch 204 may include a plurality of downlink ports. These downlink ports may be configured to operatively couple the leaf switches 204 to the plurality of hosts 202.

As shown in FIG. 1A, the network POD 101 may include a plurality of optical switches 206. Optical switches may be high speed switches that use light signals for switching and routing data. In specific embodiments, the optical switches 206 may act as intermediaries, routing the light signals between the leaf switches 204 via optical circuit connections. In example embodiments, the optical switches 206 may employ communication protocols such as Optical Transport Network (OTN) or Dense Wavelength Division Multiplexing (DWDM) to facilitate communication between the leaf switches 204, allowing for high-speed, low-latency communication between each leaf switch pair, effectively extending the network's reach and capability.

In the network POD 101, according to embodiments of the invention, when a host initiates a network communication, the data is first received by its directly connected leaf switch. Should the data be intended for a host connected to a different leaf switch, the originating leaf switch transmits the data to an optical switch, which in turn routes the data to the appropriate port on the leaf switch. Finally, the destination leaf switch forwards the data to the intended host. The network POD supports bidirectional communication, enabling seamless data flow between hosts connected to different leaf switches via optical switches.

It is to be understood that the structure of the network POD 101 and its components, connections and relationships, and their functions, are meant to be exemplary only, and are not meant to limit implementations of the embodiments described and/or claimed in this document. In one example, the network POD 101 may include more, fewer, or different components. For instance, the network POD 101 may include multiple layers of electrical switches (instead of just one layer of leaf switches shown in the FIG. 1A). In another example, some or all of the portions of the network POD 101 may be combined into a single portion, or all of the portions of the network POD 101 may be separated into two or more distinct portions.

Furthermore, embodiments of the invention contemplate the interconnection of multiple network PODs that are same or substantially similar to that of the network POD 101 to create an expansive network structure. This larger structure is accomplished through the use of various electrical switches, which serve to link individual network PODs. The resultant network structure is not only capable of executing individual tasks within each POD but is also configured to undertake tasks that span multiple PODs, thus leveraging the combined computational power and network resources. Such an interlinked network architecture enhances scalability and flexibility, providing a robust framework for executing a diverse array of tasks, ranging from simple computations to complex, resource-intensive processes such as those required by LLMs and other advanced computational models.

Figure 1B:
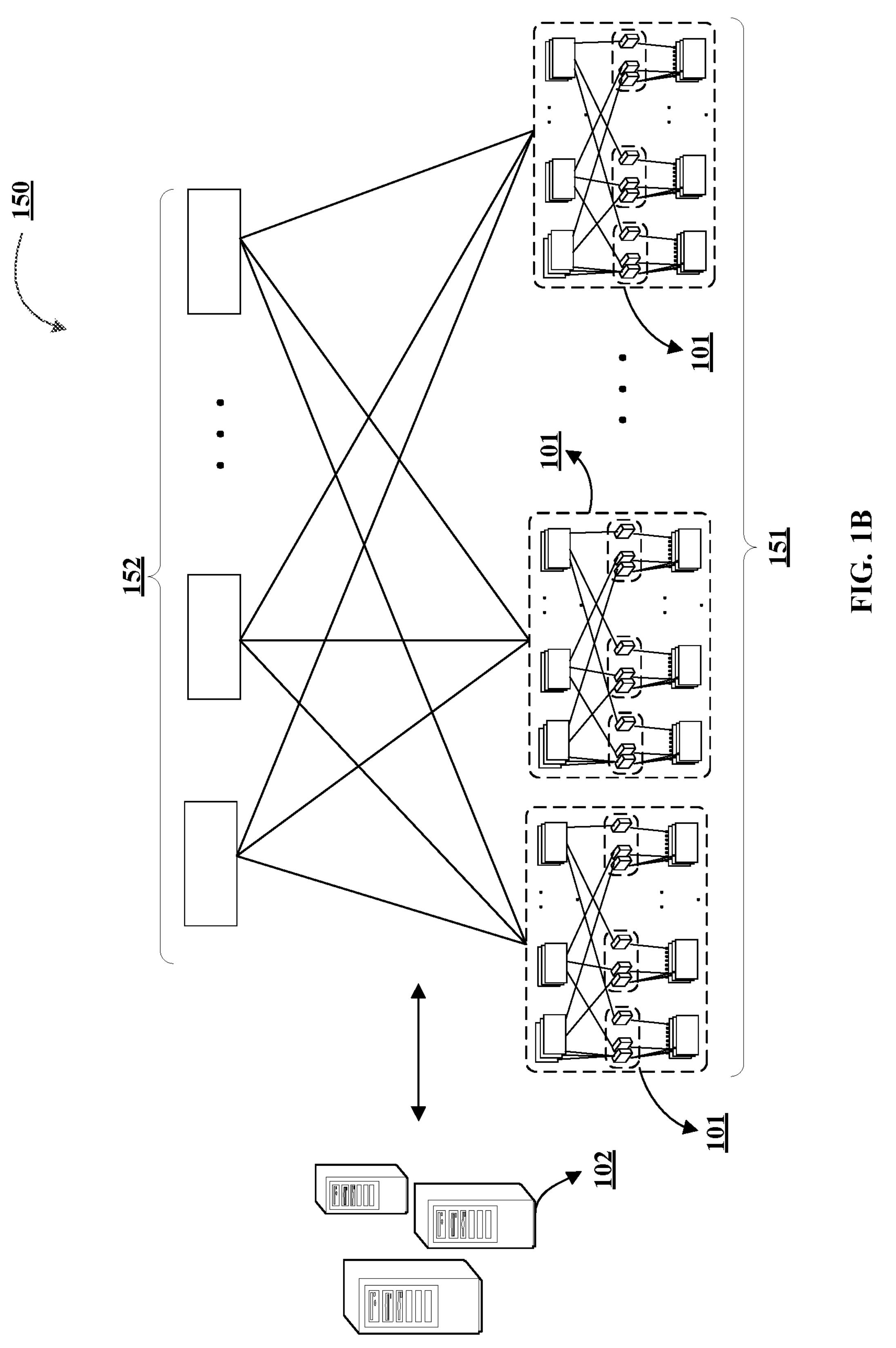

FIG. 1B illustrates an example network environment 150 for allocation of network resources for executing LLM tasks, in accordance with an embodiment of the present disclosure. As shown in FIG. 1B, the network environment 150 may include a system 102, a plurality of network PODs 151, and a plurality of switches 152. As described herein, each network POD in the plurality of network PODs 151 may have a structure that is same or substantially similar to that of the network POD 101 described in FIG. 1A. Each network POD may include a plurality of ports configured operatively couple the network POD to the plurality of switches 152.

As shown in FIG. 1B, the network environment 150 may include a plurality of switches 152 (e.g., electrical switches such as leaf switches, spine switches, and/or the like). According to specific embodiments of the invention, the plurality of switches 152 may include multiple layers of switches in the network distribution, each acting as an intermediary, interconnecting the network PODs. Each switch may include a plurality of downlink ports. These downlink ports may be configured to operatively couple the plurality of switches 152 to the plurality of network PODs 151.

It is to be understood that the structure of the network environments 100, 150 and its components, connections and relationships, and their functions, are meant to be exemplary only, and are not meant to limit implementations of the embodiments described and/or claimed in this document. In one example, the network environments 100, 150 may include more, fewer, or different components. For instance, some or all of the portions of the network environments 100, 150 may be combined into a single portion or all of the portions of the network environments 100, 150 may be separated into two or more distinct portions.

Example System Circuitry

FIG. 2 illustrates a schematic block diagram of example circuitry, some or all of which may be included in the system 102. As shown in FIG. 2, the system 102 may include a processor 112, a memory 114, input/output circuitry 116, communications circuitry 118, and resource allocation circuitry 120.

Although the term "circuitry" as used herein with respect to components 112-120 is described in some cases using functional language, it should be understood that the particular implementations necessarily include the use of particular hardware configured to perform the functions associated with the respective circuitry as described herein. It should also be understood that certain of these components 112-120 may include similar or common hardware. For example, two sets of circuitries may both leverage use of the same processor, network interface, storage medium, or the like to perform their associated functions, such that duplicate hardware is not required for each set of circuitries. It will be understood in this regard that some of the components described in connection with the system 102 may be housed together, while other components are housed separately (e.g., a controller in communication with the system 102). While the term "circuitry" should be understood broadly to include hardware, in some embodiments, the term "circuitry" may also include software for configuring the hardware. For example, in some embodiments, "circuitry" may include processing circuitry, storage media, network interfaces, input/output devices, and the like. In some embodiments, other elements of the system 102 may provide or supplement the functionality of particular circuitry. For example, the processor 112 may provide processing functionality, the memory 114 may provide storage functionality, the communications circuitry 118 may provide network interface functionality, and the like.

In some embodiments, the processor 112 (and/or co-processor or any other processing circuitry assisting or otherwise associated with the processor) may be in communication with the memory 114 via a bus for passing information among components of, for example, the system 102. The memory 114 may be non-transitory and may include, for example, one or more volatile and/or non-volatile memories, or some combination thereof. In other words, for example, the memory 114 may be an electronic storage device (e.g., a non-transitory computer readable storage medium). The memory 114 may be configured to store information, data, content, applications, instructions, or the like, for enabling an apparatus, e.g., the system 102, to carry out various functions in accordance with example embodiments of the present disclosure.

Although illustrated in FIG. 2 as a single memory, the memory 114 may comprise a plurality of memory components. The plurality of memory components may be embodied on a single computing device or distributed across a plurality of computing devices. In various embodiments, the memory 114 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 114 may be configured to store information, data, applications, instructions, or the like for enabling the system 102 to carry out various functions in accordance with example embodiments discussed herein. For example, in at least some embodiments, the memory 114 may be configured to buffer data for processing by the processor 112. Additionally, or alternatively, in at least some embodiments, the memory 114 may be configured to store program instructions for execution by the processor 112. The memory 114 may store information in the form of static and/or dynamic information. This stored information may be stored and/or used by the system 102 during the course of performing its functionalities.

The processor 112 may be embodied in a number of different ways and may, for example, include one or more processing devices configured to perform independently. Additionally, or alternatively, the processor 112 may include one or more processors configured in tandem via a bus to enable independent execution of instructions, pipelining, and/or multithreading. The processor 112 may, for example, be embodied as various means including one or more microprocessors with accompanying digital signal processor (s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, the processor 112 may include a plurality of processors. The plurality of processors may be embodied on a single computing device or may be distributed across a plurality of such devices collectively configured to function as the system 102. The plurality of processors may be in operative communication with each other and may be collectively configured to perform one or more functionalities of the system 102 as described herein.

In an example embodiment, the processor 112 may be configured to execute instructions stored in the memory 114 or otherwise accessible to the processor 112. Alternatively, or additionally, the processor 112 may be configured to execute hard-coded functionality. As such, whether configured by hardware or software methods, or by a combination thereof, the processor 112 may represent an entity (e.g., physically embodied in circuitry) capable of performing operations according to an embodiment of the present disclosure while configured accordingly. Alternatively, as another example, when the processor 112 is embodied as an executor of software instructions, the instructions may specifically configure the processor 112 to perform one or more algorithms and/or operations described herein when the instructions are executed. For example, these instructions, when executed by the processor 112, may cause the system 102 to perform one or more of the functionalities thereof as described herein.

In some embodiments, the system 102 further includes input/output circuitry 116 that may, in turn, be in communication with the processor 112 to provide an audible, visual, mechanical, or other output and/or, in some embodiments, to receive an indication of an input from a user or another source. In that sense, the input/output circuitry 116 may include means for performing analog-to-digital and/or digital-to-analog data conversions. The input/output circuitry 116 may include support, for example, for a display, touchscreen, keyboard, mouse, image capturing device (e.g., a camera), microphone, and/or other input/output mechanisms. The input/output circuitry 116 may include a user interface and may include a web user interface, a mobile application, a kiosk, or the like. The input/output circuitry 116 may be used by a user to provide the request and associated parameters associated with the LLM task.

The processor 112 and/or user interface circuitry comprising the processor 112 may be configured to control one or more functions of a display or one or more user interface elements through computer-program instructions (e.g., software and/or firmware) stored on a memory accessible to the processor 112 (e.g., the memory 114, and/or the like). In some embodiments, aspects of input/output circuitry 116 may be reduced as compared to embodiments where the system 102 may be implemented as an end-user machine or other type of device designed for complex user interactions. In some embodiments (like other components discussed herein), the input/output circuitry 116 may be eliminated from the system 102. The input/output circuitry 116 may be in communication with memory 114, communications circuitry 118, and/or any other component(s), such as via a bus. Although more than one input/output circuitry and/or other component can be included in the system 102, only one is shown in FIG. 2 to avoid overcomplicating the disclosure (e.g., as with the other components discussed herein).

The communications circuitry 118, in some embodiments, includes any means, such as a device or circuitry embodied in either hardware, software, firmware or a combination of hardware, software, and/or firmware, that is configured to receive and/or transmit data from/to a network and/or any other device, circuitry, or module associated therewith. In this regard, the communications circuitry 118 may include, for example, a network interface for enabling communications with a wired or wireless communication network. For example, in some embodiments, communications circuitry 118 may be configured to receive and/or transmit any data that may be stored by the memory 114 using any protocol that may be used for communications between computing devices. For example, the communications circuitry 118 may include one or more network interface cards, antennae, transmitters, receivers, buses, switches, routers, modems, and supporting hardware and/or software, and/or firmware/software, or any other device suitable for enabling communications via a network. Additionally, or alternatively, in some embodiments, the communications circuitry 118 may include circuitry for interacting with the antenna(s) to cause transmission of signals via the antenna (e) or to handle receipt of signals received via the antenna (e). These signals may be transmitted by the system 102 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. The communications circuitry 118 may additionally or alternatively be in communication with the memory 114, the input/output circuitry 116, and/or any other component of the system 102, such as via a bus. The communication circuitry 118 of the system 102 may also be configured to receive and transmit information with the various components associated therewith.

The resource allocation circuitry 120, in some embodiments, may be used to facilitate execution of a computationally intensive LLM task. By taking into account input variables such as parallelism parameters and associated communication patterns, the resource allocation circuitry 120 may be configured to dynamically configure and/or reconfigure the network POD to execute the LLM task. For instance, based on the data parallelism parameter, the resource allocation circuitry 120 may segment the execution of the LLM task into a plurality of pipelines, and based on the pipeline parallelism parameter, the resource allocation circuitry 120 may segment each pipeline into a plurality of pipeline stages. Once segmented, the resource allocation circuitry 120 may allocate these pipelines and their constituent stages among various hosts within the network POD. Post-configuration, the resource allocation circuitry 120 may trigger execution of the LLM task by transmitting the appropriate signal or command to the processor 112, which initiates the execution of the LLM task. In specific embodiments, the resource allocation circuitry 120 may also continuously monitor network performance metrics and may make real-time adjustments to maintain optimal performance.

In some embodiments, the system 102 may include hardware, software, firmware, and/or a combination of such components, configured to support various aspects of resource allocation implementations as described herein. It should be appreciated that in some embodiments, the resource allocation circuitry 120 may perform one or more of such example actions in combination with another circuitry of the system 102, such as the memory 114, processor 112, input/output circuitry 116, and communications circuitry 118. For example, in some embodiments, the resource allocation circuitry 120 utilizes processing circuitry, such as the processor 112 and/or the like, to form a self-contained subsystem to perform one or more of its corresponding operations. In a further example, and in some embodiments, some or all of the functionality of the resource allocation circuitry 120 may be performed by the processor 112. In this regard, some or all of the example processes and algorithms discussed herein can be performed by at least one processor 112 and/or the resource allocation circuitry 120. It should also be appreciated that, in some embodiments, the resource allocation circuitry 120 may include a separate processor, specially configured field programmable gate array (FPGA), or application specific interface circuit (ASIC) to perform its corresponding functions.

Additionally, or alternatively, in some embodiments, the resource allocation circuitry 120 may use the memory 114 to store collected information. For example, in some implementations, the resource allocation circuitry 120 may include hardware, software, firmware, and/or a combination thereof, that interacts with the memory 114 to send, retrieve, update, and/or store data.

Accordingly, non-transitory computer readable storage media can be configured to store firmware, one or more application programs, and/or other software, which include instructions and/or other computer-readable program code portions that can be executed to direct operation of the system 102 to implement various operations, including the examples described herein. As such, a series of computer-readable program code portions may be embodied in one or more computer-program products and can be used, with a device, system 102, database, and/or other programmable apparatus, to produce the machine-implemented processes discussed herein. It is also noted that all or some of the information discussed herein can be based on data that is received, generated and/or maintained by one or more components of the system 102. In some embodiments, one or more external systems (such as a remote cloud computing and/or data storage system) may also be leveraged to provide at least some of the functionality discussed herein.

Example Allocations of Network Resources

Figure 3A:
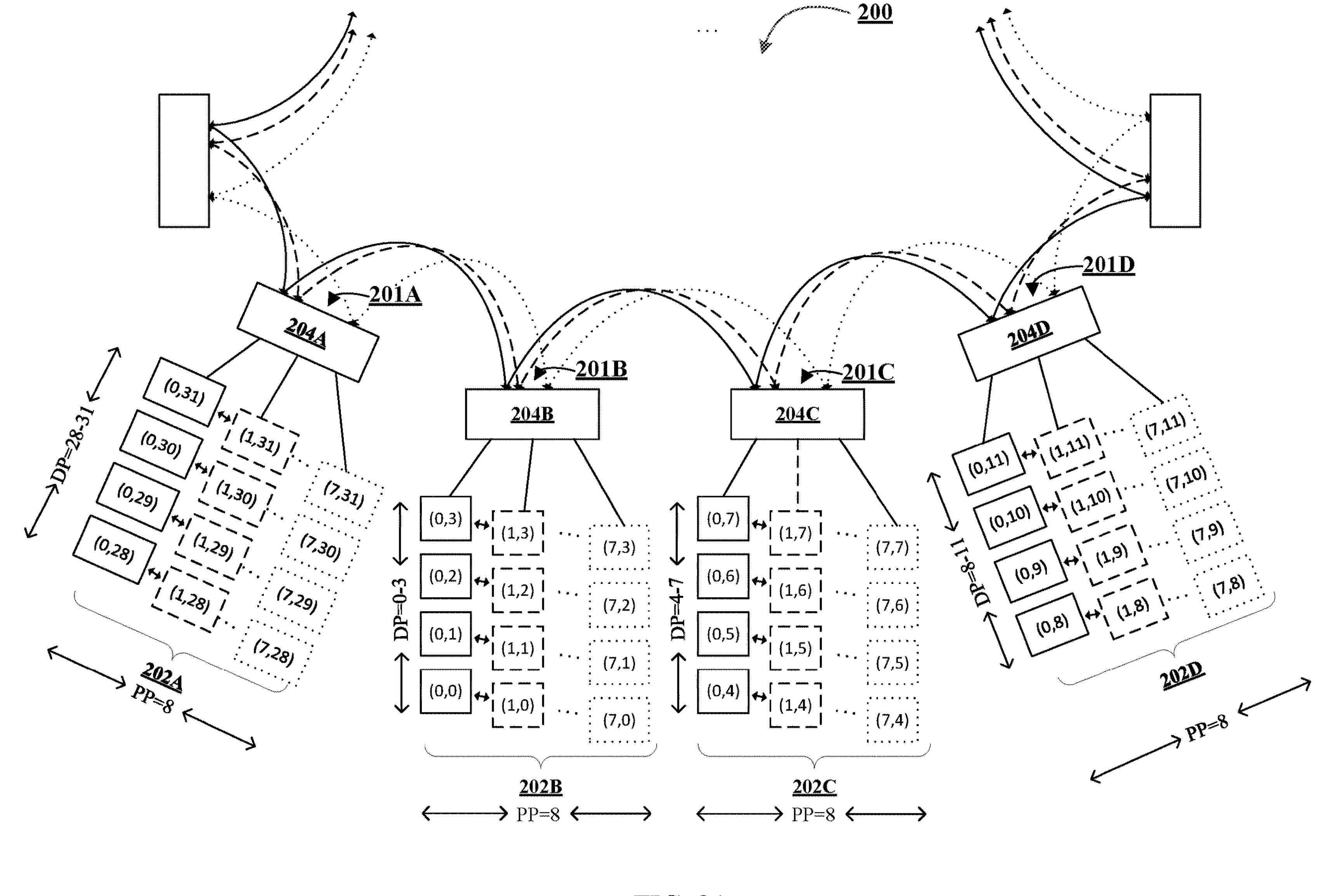
FIG. 3A illustrates a portion of a first closed loop network POD for allocation of network resources for executing LLM tasks, in accordance with an embodiment of the present disclosure.

FIG. 3A illustrates a portion of first closed loop network POD 200 for allocation of network resources for executing LLM tasks, in accordance with an embodiment of the present disclosure. As described herein, an LLM task (e.g., the training of LLMs) not only requires substantial computational resources but also benefits significantly from the efficient allocation and utilization of network resources, especially in distributed task settings. Transmitting large datasets over a network and coordinating the execution of the task across multiple computational nodes necessitates high bandwidth and low-latency connections. Any impediment to data flow or network communication can adversely affect the execution of the LLM task. Given the extensive size and complexity of LLMs, the allocation of adequate computational and network resources is crucial to prevent prolonged task execution durations and to ensure optimal performance.

To manage the computational demands, techniques such as parallelism are often employed. Parallelism facilitates the efficient processing of large datasets and complex computations, thus promoting optimal resource utilization and cost-effectiveness. Embodiments of the invention process the LLM task using pipeline parallelism, data parallelism, and/or tensor parallelism. Data parallelism may refer to a computational strategy where a task (e.g., LLM task) is divided across computational units (e.g., hosts), each working on a different partition of the data. In this approach, the same operation is executed in parallel on separate data points. This division of labor is particularly effective when dealing with large datasets or tasks that can be easily partitioned and executed independently. By distributing the workload across multiple computational units, data parallelism enhances the efficiency and scalability of computational tasks, allowing for the handling of larger datasets and more complex computations within a feasible timeframe. Pipeline parallelism may refer to a computational strategy where a task (e.g., LLM task) is divided into a sequence of stages, with each stage performing a specific part of the overall task. In pipeline parallelism, each stage of the task may be executed by a different computational unit. Once a stage completes its part of the task, it passes its output to the next stage in the pipeline while simultaneously receiving input for a new instance of the task. By allowing different stages of a task to be processed simultaneously, pipeline parallelism improves the overall efficiency and reduces the time taken to complete the entire task. Tensor parallelism may refer to a computational strategy where processing of multi-dimensional data structures involved in the execution of a task is distributed across multiple computational units. For purposes of the invention, in embodiments where the hosts are in a clustered configuration with multiple computational units, the tensor parallelism may be managed within each host having multiple computational units that are tightly interconnected via a parallel switched (e.g., electrically switched) internal network.

When employing parallelism strategies, each strategy may be associated with a communication pattern. A communication pattern may refer to a set of operations that manage and facilitate communication among the various hosts. These set of operations are useful when coordinating tasks and data exchange in environments where multiple hosts work together to execute the task. Examples of communication patterns may include broadcast, point-to-point, scatter, gather, reduction operations, barriers, and/or the like. In some embodiments, the communication pattern may be specific to the parallelism parameter. For instance, the communication pattern for data parallelism may be collective operations such as a reduction operation among all parallel units (e.g., hosts), facilitating synchronization and aggregation of results from each data partition. The communication pattern for pipeline parallelism may include point-to-point interactions between sequential stages of the pipeline. In some embodiments, the communication pattern for tensor parallelism (and/or expert parallelism) may include same or similar communication patterns as that of data parallelism or pipeline parallelism. As such, embodiments of the invention may be applicable to communication networks facilitating tensor parallelism therewithin.

For a particular LLM task, an incoming request may include parallelism parameters, specific to a parallelism strategy and an associated communication pattern. In an example embodiment, the incoming request may include a data parallelism parameter to employ a data parallelism strategy. The data parallelism parameter may indicate a number of data partitions for executing the LLM task, where each data partition is processed by a pipeline, thus allowing for multiple pipelines to execute the LLM task concurrently. In another embodiment, the incoming request may include a pipeline parallelism parameter to employ a pipeline parallelism strategy. The pipeline parallelism parameter may indicate a number of pipeline stages for each pipeline for distributed processing of a corresponding data partition. Here, each pipeline stage may represent a portion of the corresponding data partition. Based on the data parallelism parameter, the execution of the LLM task may be segmented into a plurality of pipelines. Based on the pipeline parallelism parameter, each pipeline may be segmented into a plurality of pipeline stages. The pipelines and their corresponding pipeline stages may be allocated to various hosts within the network POD.

These hosts may either be operatively coupled to a single switch (e.g., a leaf switch) or distributed across multiple switches. In instances in which the hosts are operatively coupled to a single switch, each host assigned to process a particular pipeline stage of a given pipeline may be operatively coupled to another host that is assigned to process the corresponding pipeline stage of the subsequent pipeline for data portion communication. Here, the data portion communication may be based on the communication pattern associated with the data parallelism parameter. Similarly, within each pipeline, each host that is assigned to process a pipeline stage may be operatively coupled to another host that is assigned to process the next sequential pipeline stage for pipeline communication. Here, the pipeline communication may be based on the communication pattern associated with the pipeline parallelism parameter. In instances in which the hosts are distributed across multiple switches, embodiments of the invention may determine a set of optical circuit connections for each switch to facilitate data portion communication between the hosts across the switches and set of optical circuit connections for each switch for pipeline communication between the hosts across the switches.

To illustrate resource allocation in conjunction with particular parallelism parameters, a closed loop network POD 200 is described. As an example, an incoming request may include a data parallelism parameter indicating 32 pipelines and a pipeline parallelism parameter indicating 8 stages per pipeline. As shown in FIG. 3A, the closed loop network structure 200 may include a plurality of switches 204A, 204B, 204C, 204D and a corresponding subset of hosts 202A, 202B, 202C, 202D under each switch. Each switch (e.g., the plurality of switches 204A, 204B, 204C, 204D) in the network POD may be equipped with 64 ports, of which 32 are dedicated to optical circuit connections for inter-switch connectivity via optical switches (not shown). The remaining 32 ports may be designated for connecting the hosts to the switch (e.g., hosts 202A to switch 204A, hosts 202B to switch 204B, and so on). Each host in the subset of hosts 202A, 202B, 202C, 202D may be represented in tuples, e.g., (a,b), where a may represent the specific stage of the pipeline being processed by said host, and b may represent the specific data portion being assigned to said host for processing. For example, host (7,3) in the subset of hosts 202B under leaf switch 204B is configured to execute the eighth pipeline stage of the LLM task in the fourth pipeline.

In this example, for optimal performance, all pipeline stages for each pipeline are distributed across hosts that are operatively coupled to a single switch. For example, hosts (0,0), . . . , (7,0) are assigned to process a first pipeline under switch 204B. Given this configuration, a total of 4 pipelines may be allocated under each of the 8 switches in the network POD, thus accounting for all 32 pipelines. These switches are operatively coupled to one another in a closed loop topology, where each switch is operatively coupled to another switch on either side using optical circuit connections. For example, switch 204B is operatively coupled to switch 204A on the left and switch 204C on the right. Because all eight pipeline stages for each pipeline are distributed across hosts operatively coupled to a single switch, there is no need for pipeline communication across switches. However, the distribution of the 32 pipelines between 8 switches, with 4 pipelines under each switch, necessitates data portion communication between the switches. This is particularly relevant in the closed loop topology, where each switch is operatively coupled to adjacent switches.

To facilitate data portion communication, optical circuit connections 201A, 201B, 201C, 201D are employed according to embodiments of the invention. The determination of the number of optical circuit connections for each switch (e.g., 204B) for data portion communication with adjacent switches (e.g., 204A and 204C) on either side is contingent upon the specific bandwidth requirements of the network POD. In scenarios where the network POD demands full bisection bandwidth and the communication pattern is ring all-reduce, the number of optical circuit connections for each switch must be equal to or greater than twice the number of pipeline stages when the bandwidth requirement for each data portion communication uses the total bandwidth of the optical circuit connection. Said differently, the number of optical circuit connections for each switch (e.g., 204B) for data portion communication with adjacent switches on either side (e.g., 204A and 204C) is greater than or equal to 2*ps*k. Here, ps is number of pipeline stages allocated to a subset of the plurality of hosts (e.g., 202A) that are operatively coupled to each switch (e.g., 204A), and k is a fractional bandwidth requirement for each data portion communication relative to a total bandwidth of an optical circuit connection. The multiplication by a factor of 2 is to facilitate communication from the switch to adjacent switches on either side, e.g., 204B to 204A and 204B to 204C. Consequently, when k=1, the number of optical circuit connections for each switch (e.g., 204B) is 16, with 8 optical circuit connections used for data portion communication with the switch (e.g., 204A) on one side and 8 optical circuit connections used for data portion communication with the switch (e.g., 204C) on the other side.

Figure 3B:
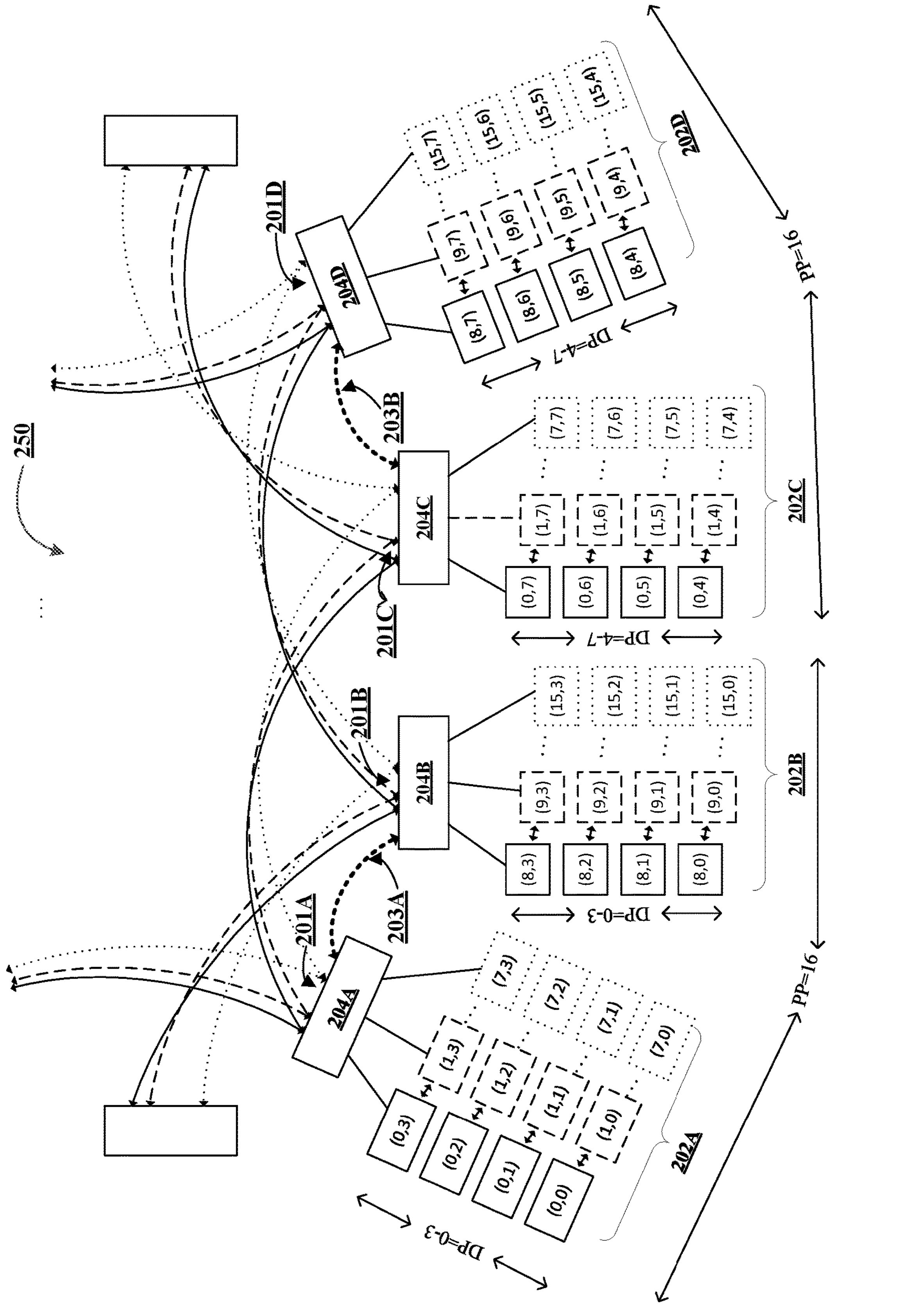
FIG. 3B illustrates a portion of a second closed loop network POD for allocation of network resources for executing LLM tasks, in accordance with an embodiment of the present disclosure.

FIG. 3B illustrates a portion of a second closed loop network POD 200 for allocation of network resources for executing LLM tasks, in accordance with an embodiment of the present disclosure. In this example, an incoming request includes a data parallelism parameter indicating 32 pipelines and a pipeline parallelism parameter indicating 16 stages per pipeline. As shown in FIG. 3B, the closed loop network structure 200 may include a plurality of switches 204A, 204B, 204C, 204D and a corresponding subset of hosts 202A, 202B, 202C, 202D under each switch. Each switch (e.g., the plurality of switches 204A, 204B, 204C, 204D) in the network POD may be equipped with 64 ports, of which 32 are dedicated to optical circuit connections for inter-switch connectivity via optical switches (not shown). The remaining 32 ports may be designated for connecting the hosts to the switch (e.g., hosts 202A to switch 204A, hosts 202B to switch 204B, and so on). Each host in the subset of hosts 202A, 202B, 202C, 202D may be represented in tuples, e.g., (a,b), where a may represent the specific stage of the pipeline being processed by said host, and b may represent the specific data portion being assigned to said host for processing. For example, host (7,3) in the subset of hosts 202A under leaf switch 204A, is configured to execute the eighth pipeline stage of the LLM task in the fourth pipeline.

Due to port constraints of the switches, the pipeline stages for each pipeline are distributed across hosts that are operatively coupled to a pair of switches (e.g., 204A and 204B) with 8 pipeline stages distributed across 8 hosts under one switch (e.g., 204A) and 8 remaining pipeline stages distributed across 8 hosts under another switch (e.g., 204B). For example, hosts (0,0), . . . , (7,0) are assigned to process a portion of the first pipeline under switch 204A, and hosts (8,0), . . . , (15,0) are assigned to process the remaining portion of the first pipeline under switch 204B. Given this configuration, a total of 4 pipelines may be allocated under each of the 8 pairs of switches 204A and 204B, 204C and 204D, and so on, in the network POD, thus accounting for all 32 pipelines. These pairs of switches 204A and 204B, 204C and 204D, and so on, are operatively coupled to one another in a closed loop topology, where each pair of switches (e.g., 204A and 204B) is operatively coupled to another pair of switches on either side (e.g., 204C and 204D) using optical circuit connections. The distribution of the 16 pipeline stages across the pairs of switches 204A and 204B, 204C and 204D, and so on, necessitates pipeline communication between the pair of switches.

To facilitate pipeline communication, optical circuit connections 203A, 203B are employed according to embodiments of the invention. For example, to facilitate pipeline communication across the pair of switches 204A and 204B, optical circuit connections 203A are employed. Similarly, to facilitate pipeline communication across the pair of switches 204C and 204D, optical circuit connections 203B are employed. The determination of the number of optical circuit connections for each switch (e.g., 204A) for pipeline communication with its corresponding switch pair (e.g., 204B) may be contingent upon the specific bandwidth requirements of the network POD. In scenarios where the network POD demands full bisection bandwidth, the number of optical circuit connections for each switch (e.g., 204A) for pipeline communication with its corresponding switch pair (e.g., 204B) must be twice the total number of pipelines under the switch when the bandwidth requirement for each pipeline communication uses the total bandwidth of the optical circuit connection. Said differently, the number of optical circuit connections for each switch for pipeline communication with its corresponding switch pair is greater than or equal to 2*p*m, where p is the number of pipelines allocated to the subset of the plurality of hosts that are operatively coupled to each switch, and m is a fractional bandwidth requirement for each pipeline communication relative to a total bandwidth of an optical circuit connection. Here, because each switch in the switch pair 204A and 204B has 4 pipelines, the total number of optical circuit connections 203A for pipeline communication is 8 when p=1. The multiplication by a factor of 2 is to facilitate pipeline communication from the switch pair to adjacent switch pairs on either side.

In addition, the distribution of the 32 pipelines across 8 pairs of switches 204A and 204B, 204C and 204D, and so on, with 4 pipelines under each switch pair (e.g., 204A and 204B), necessitates data portion communication between the pairs of switches 204A and 204B, 204C and 204D, and so on. To facilitate data portion communication, optical circuit connections 201A, 201B, 201C, 201D are employed according to embodiments of the invention. The determination of the number of optical circuit connections (e.g., 201A) for each switch (e.g., 204A) in the switch pair (e.g., 204A and 204B) for data portion communication with adjacent pairs of switches (e.g., 204C and 204D) on either side is contingent upon the specific bandwidth requirements of the network POD. In scenarios where the network POD demands full bisection bandwidth, the number of optical circuit connections for each switch in the switch pair must be equal to or greater than 2*ps*k. Consequently, when k=1, the number of optical circuit connections for each switch (e.g., 204A) is 16, with 8 optical circuit connections used for data portion communication with a corresponding switch (e.g., 204C) on one side and 8 optical circuit connections used for data portion communication with a corresponding switch (not shown) in the switch pair (not shown) on the other side.

The parameters of the closed loop network structure delineated in FIGS. 3A and 3B are solely for illustrative purposes and do not represent any limitation on the scope of the invention. The specified parameters are exemplary in nature, intended to provide a clearer understanding of embodiments of the invention described herein. It should be understood that various other configurations, dimensions, and values may be employed without departing from the essence and scope of the claimed invention. The depiction of these parameters in the figure is not meant to be restrictive but to furnish a representative embodiment for elucidating the invention.

Example SHARP Model Configuration of the Network POD

Figure 4:
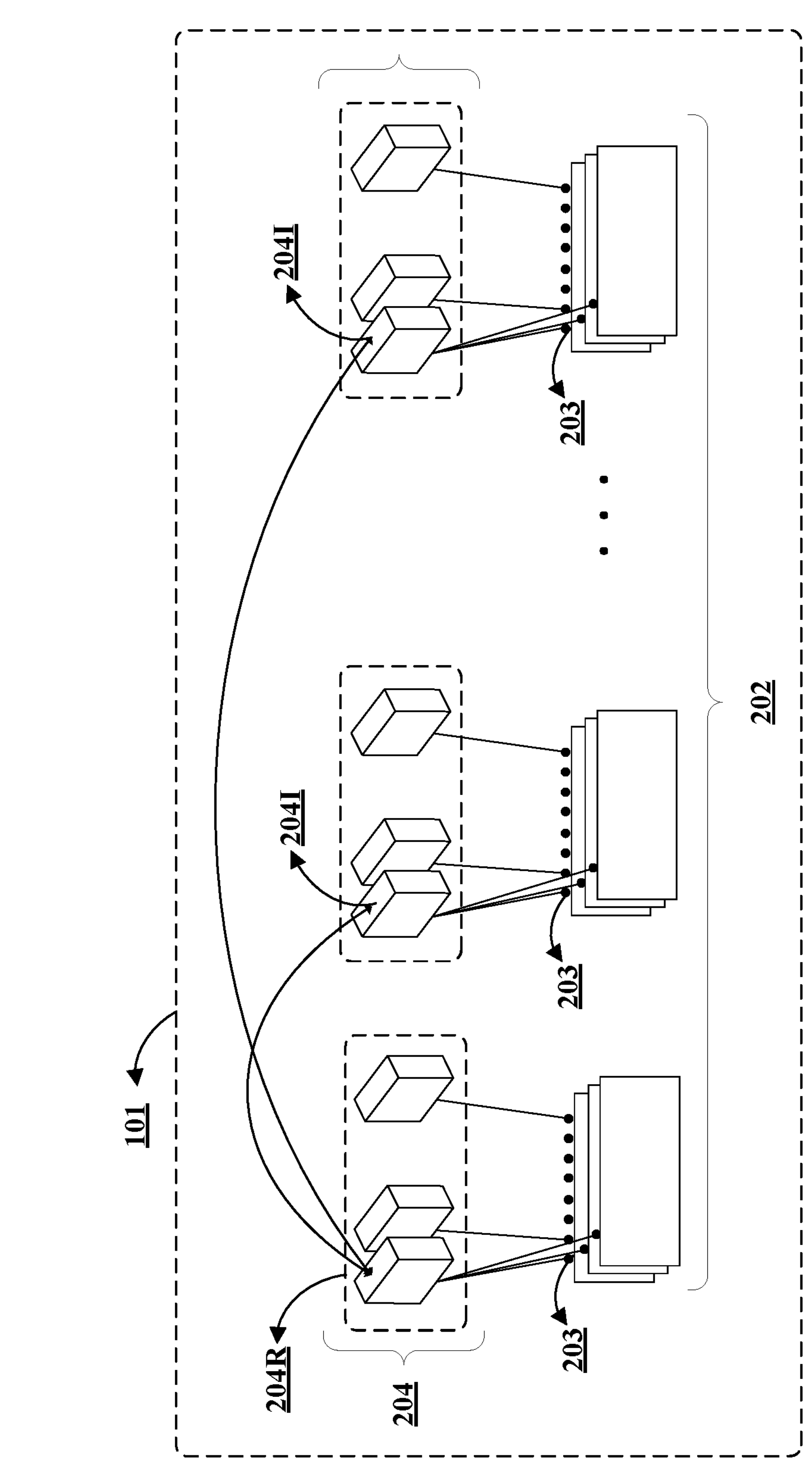
FIG. 4 illustrates a SHARP model configuration of the network POD, in accordance with an embodiment of the invention.

FIG. 4 illustrates a SHARP model configuration 400 of the network POD, in accordance with an embodiment of the invention. The SHARP model, as described herein, may refer to an in-network communication collective designed to optimize the efficiency of data aggregation and reduction operations in a large-scale, high-performance computing environment. The network POD 101 utilizes a SHARP model configuration, a network optimization technology that enhances the efficiency of collective operations, particularly in high-performance computing environments with distributed architectures. A SHARP configuration allows the network POD 101 to offload collective communication operations from the hosts to the network fabric (e.g., switches), reducing the amount of data movement and the number of required data hops, which in turn lowers latency and improves overall application performance. The SHARP model leverages network switches capable of performing certain data processing tasks, thereby reducing the computational load on the hosts, and minimizing network congestion. By aggregating data as it moves up the hierarchy and distributing it as it moves down, SHARP enables efficient and scalable communication patterns that are particularly advantageous for applications that involve a significant amount of data exchange between hosts, such as those running Large Language Models (LLMs) or other machine learning algorithms that require distributed training or inference.

As shown in FIG. 4, the network POD 101 may include a plurality of hosts 202 and a plurality of switches 204. As described herein, a host may be a single computational unit, or a cluster of computational units interconnected via an internal network, functioning collectively as a single entity, configured to perform computational tasks (e.g., LLM tasks) and facilitate data exchange within the network POD. Each host may be equipped with ports 203 that may serve as a primary means of connection to the network. Each host may be operatively coupled to a leaf switch 204.

As shown in FIG. 4, the network POD 101 may include a plurality of leaf switches 204 that serve as the primary layer of network distribution within the network POD, acting as an intermediary, interconnecting the hosts 202. In embodiments where the hosts are in an interconnected clustered configuration, the leaf switches may function as intermediary between the computational units across the hosts 202 such that each computation unit in a particular host may be connected to a corresponding computational unit in another host. Each leaf switch 204 may include a plurality of uplink ports. These uplink ports may be configured to operatively couple the leaf switches 204 to the plurality of optical switches (not shown). Additionally, each leaf switch 204 may include a plurality of downlink ports. These downlink ports may be configured to operatively couple the leaf switches 204 to the plurality of hosts 202.

As shown in FIG. 4, the network POD 101 may include a root switch 204R that may be any one of the plurality of leaf switches 204, acting as the central point for aggregating data from various hosts. The root switch 204R may be equipped with advanced networking capabilities that allow for execution of SHARP's offloading features. The root switch 204R may perform operations such as data summation, averaging, or other collective functions directly within the network fabric. In example embodiments, the root switch 204R may be designed to manage high volumes of data and maintain efficient communication with multiple aggregation points or intermediate switches 2041. These intermediate switches 2041 may communicate with the root switch 204R, forming a tree-like structure that enables the SHARP model to efficiently manage data traffic, enhance performance, and facilitate scalability in complex network environments.

In the implementation of in-network collectives, specifically for reduction operations, each switch may be configured with a designated number of uplinks. These uplinks may correspond to the varied reduction requirements of the hosts under the purview of each respective switch. For root switches, the configuration may include links that are strategically allocated to aggregate inputs from all switches involved in a particular job. Such a setup facilitates the construction of multi-level tree architectures, enhancing the network's ability to efficiently manage complex data flows and operations.

Within the present disclosure, it is to be understood that the structure of the network POD in the SHARP configuration is provided as an exemplary embodiment. It should be appreciated that this configuration is illustrative in nature and is not intended to be limiting. The network POD, as depicted, demonstrates a hierarchical arrangement of hosts and switches culminating in a root switch, which facilitates efficient data aggregation and reduction operations as per the SHARP model. This configuration exemplifies a scalable and efficient in-network collective architecture designed to optimize collective communication operations and enhance performance in compute-intensive environments. The described embodiment showcases a network setup that is capable of supporting high-bandwidth and low-latency data transfers, which are critical for the execution of complex computational tasks such as those associated with LLMs. While the in-network collective configuration is presented as an example, it should be understood that variations and modifications to this structure are possible and fall within the scope of the invention.

Example Methods for Allocation of Network Resources

FIG. 5 illustrates an example method 400 for allocation of network resources for executing LLM tasks, in accordance with an embodiment of the present disclosure. As shown in block 402, the method may include receiving an LLM task and an input specifying information associated with execution of the LLM task, wherein the input comprises at least a parallelism parameter and a communication pattern. As described herein, parallelism facilitates the efficient processing of large datasets and complex computations, thus promoting optimal resource utilization and cost-effectiveness. In some embodiments, the parallelism parameter may include a data parallelism parameter that may indicate a number of data partitions for executing the LLM task, where each data partition is processed by a pipeline, thus allowing for multiple pipelines to execute the LLM task concurrently. The communication pattern may be specific to the data parallelism parameter. For instance, the communication pattern for data parallelism may be collective operations such as a reduction operation among all parallel units (e.g., hosts), facilitating synchronization and aggregation of results from each data partition. In some embodiments, the parallelism parameter may include a pipeline parallelism parameter indicating a number of pipeline stages for each pipeline for distributed processing of a corresponding data partition. Here, each pipeline stage may represent a portion of the corresponding data partition. The communication pattern for pipeline parallelism may include point-to-point interactions between sequential stages of the pipeline. In some embodiments, the parallelism parameter may also include a tensor parallelism parameter indication a number of computation units to distribute the computations involved in processing multi-dimensional data structures involved in the execution of the LLM task. As described herein, a host may be a single computational unit, equipped with the capability to independently execute parts of the task, or a cluster of computational units interconnected via an internal network, functioning collectively as a single entity. In a clustered configuration, the host, as the single entity, may independently execute parts of the task, leveraging the interconnected nature of its multiple computational units. In cases where the hosts are in a clustered configuration with multiple computational units, the tensor parallelism may be managed within each host.

As shown in block 404, the method may include determining a plurality of hosts based on at least the parallelism parameter and the communication pattern. Based on the data parallelism parameter, the execution of the LLM task may be segmented into a plurality of pipelines. These pipelines represent a division of the overall task into parallel workflows, each capable of being executed concurrently to enhance computational efficiency and reduce processing time. Based on the pipeline parallelism parameter, each pipeline may be segmented into a plurality of pipeline stages. The pipeline parallelism parameter influences the granularity of the task division within each pipeline, allowing for even distribution of computational workload. Each pipeline stage may be designed to execute a specific subset of operations required by the LLM task, and the stages may be processed in a sequential manner within each pipeline. The allocation of these pipelines and their constituent stages is strategically distributed among various hosts within the network POD. Each host within the POD may be tasked with processing one or more stages of a pipeline, ensuring that the LLM task is executed in a distributed fashion.

In specific embodiments, a count of the plurality of hosts may be determined based on the parallelism parameters. For example, in cases where the parallelism parameters include data parallelism parameters, pipeline parallelism parameters, and tensor parallelism parameters, the count of the plurality of hosts may be determined as a product of the number of pipelines as defined by the data parallelism parameter, number of stages per pipeline as defined by the pipeline parallelism parameter, and a number of computation units involved in processing multi-dimensional data structures as defined by the tensor parallelism parameter.

In some embodiments, each host tasked with processing a particular pipeline stage of a given pipeline may be operatively coupled to another host that is tasked with processing the corresponding pipeline stage of the subsequent pipeline for data portion communication. Here, the data portion communication may be based on the communication pattern associated with the data parallelism parameter. Similarly, within each pipeline, each host that is tasked with processing a pipeline stage may be operatively coupled to another host that is tasked with processing the next sequential pipeline stage for pipeline communication. Here, the pipeline communication may be based on the communication pattern associated with the pipeline parallelism parameter.

As shown in block 406, the method may include determining a plurality of switches based on the plurality of hosts. In some embodiments, the hosts may either be operatively coupled to a single switch (e.g., leaf switch) or distributed across multiple switches. In instances in which the hosts are operatively coupled to a single switch, each host assigned to process a particular pipeline stage of a given pipeline may be operatively coupled to another host that is assigned to process the corresponding pipeline stage of the subsequent pipeline for data portion communication. Similarly, within each pipeline, each host that is assigned to process a pipeline stage may be operatively coupled to another host that is assigned to process the next sequential pipeline stage for pipeline communication. In instances in which the hosts are distributed across multiple switches, the method may include determining a set of optical circuit connections for each switch to facilitate data portion communication between the hosts across the switches and set of optical circuit connections for each switch for pipeline communication between the hosts across the switches.

As shown in block 406, the process flow may include operatively coupling the plurality of hosts to the plurality of switches to dynamically configure a network point of delivery (POD). As described herein, set of optical circuit connections (e.g., first set of optical circuit connections) for each switch to facilitate data portion communication may be determined based on the pipeline parallelism parameter (e.g., number of pipeline stages per pipeline). The set of optical connections (e.g., second set of optical circuit connections) for each switch to facilitate pipeline communication between the hosts across the switches may be determined based on the data parallelism parameter (e.g., number of pipelines). In some embodiments, a count of the optical circuit connections for each switch to facilitate data portion communication and a count of the optical circuit connections for each switch to facilitate pipeline communication between the hosts may be determined to satisfy a specific bandwidth requirement associated with the network POD. In example embodiments, in instances in which the specific bandwidth requirement is a full-bisection bandwidth requirement, the count of the optical circuit connections for each switch to facilitate data portion communication may be greater than or equal to 2*ps*k. Here, ps is number of pipeline stages allocated to a subset of the plurality of hosts that are operatively coupled to each switch, and k is a fractional bandwidth requirement (in each direction of the closed loop) for each data portion communication relative to a total bandwidth of an optical circuit connection in the first set of optical circuit connections. Similarly, the count of the optical circuit connections for each switch to facilitate pipeline communication between the hosts may be greater than or equal to 2*p*m. Here, p is the number of pipelines allocated to the subset of the plurality of hosts that are operatively coupled to each switch, and m is a fractional bandwidth requirement for each pipeline communication relative to a total bandwidth (in each direction) of an optical circuit connection in the second set of optical circuit connections.

In some embodiments, the LLM task may executed by a single network POD, or, depending on the computation requirement, by a cluster of network PODs interconnected via switches (e.g., spine switches). In some embodiments, the network POD may be configured based on a closed loop topology (e.g., ring topology, torus topology, and/or the like)

to allow the plurality of hosts to communicate with one another via the plurality of switches. In some other embodiments, the network POD may be configured based on an in-network collective such as a scalable hierarchical aggregation and reduction protocol (SHARP) model. In the SHARP model, the plurality of hosts communicate with a root switch that acts as a central aggregation point for all data communications within the network POD, receiving, processing, and directing data from the plurality of hosts via the plurality of switches.

As shown in block 408, the method may include triggering execution of the LLM task using the network POD. Once the network POD is configured, the method may include triggering execution of the LLM task using the network POD. In embodiments where the computation requirements of the LLM task necessitates the use of an interconnected cluster of network PODs, embodiments of the invention may trigger the execution of the LLM task using the interconnected cluster of network PODs.

FIG. 5 thus illustrates flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 114 of the system 102 and executed by a processor 112 of the system 102. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| Docket Number | U.S. patent application Ser. No. | Title | Filed On |
|---|---|---|---|
| 048833.000159 | To be assigned | SYSTEM FOR ALLOCATION OF NETWORK RESOURCES FOR EXECUTING DEEP LEARNING RECOMMENDATION MODEL (DLRM) TASKS | Concurrently herewith |

What is claimed is:

1. A method, the method comprising:

receiving a large language model (LLM) task and an input specifying information associated with execution of the LLM task, wherein the input comprises at least a data parallelism parameter, a pipeline parallelism parameter, and a communication pattern;

determining a plurality of hosts based on at least the parallelism parameter and the communication pattern;

segmenting the execution of the LLM task into a plurality of pipelines based on at least the data parallelism parameter;

segmenting each pipeline into a plurality of pipeline stages based on the pipeline parallelism parameter;

allocating the plurality of pipelines and the plurality of pipeline stages among the plurality of hosts, wherein the plurality of hosts is interconnected for data portion communication and pipeline communication;

determining a plurality of switches based on the plurality of hosts;

determining, based on the data parallelism parameter, a first set of optical circuit connections for each switch to facilitate the data portion communication between the plurality of hosts across the plurality of switches;

determining, based on the pipeline parallelism parameter, a second set of optical circuit connections for each switch to facilitate the pipeline communication between the plurality of hosts across the plurality of switches;

operatively coupling the plurality of switches using the first set of optical circuit connections and the second set of optical circuit connections;

dynamically configuring a network point of delivery (POD) by operatively coupling the plurality of hosts to the plurality of switches using the first set of optical circuit connections and the second set of optical circuit connections; and triggering execution of the LLM task using the network POD, wherein a count of the first set of optical circuit connections and a count of the second set of optical circuit connections is determined to satisfy a full-bisection bandwidth requirement.

2. The method of claim 1, wherein the data parallelism parameter indicates a number of pipelines for executing the LLM task, wherein each pipeline represents a data partition, wherein the pipeline parallelism parameter indicates a number of pipeline stages for each pipeline, wherein each pipeline stage represents a portion of the corresponding data partition.

3. The method of claim 1, wherein the data portion communication is based on the communication pattern associated with the data parallelism parameter and the pipeline communication is based on the communication pattern associated with the pipeline parallelism parameter.

4. The method of claim 1, wherein, the count of the first set of optical circuit connections is greater than or equal to 2*ps*k, wherein ps is number of pipeline stages allocated to a subset of the plurality of hosts that are operatively coupled to each switch, wherein k is a fractional bandwidth requirement for each data portion communication in each direction relative to a total bandwidth of an optical circuit connection in the first set of optical circuit connections, and the count of the second set of optical circuit connections is greater than or equal to 2*p*m, wherein p is the number of pipelines allocated to the subset of the plurality of hosts that are operatively coupled to each switch, and wherein m is a fractional bandwidth requirement for each pipeline communication in each direction relative to a total bandwidth of an optical circuit connection in the second set of optical circuit connections.

5. The method of claim 1, wherein the plurality of hosts is operatively coupled to a same switch.

6. The method of claim 1, wherein the network POD is configured based on a closed loop topology to allow the plurality of hosts to communicate with one another via the plurality of switches, wherein the closed loop topology comprises at least one of a ring topology or a torus topology.

7. The method of claim 1, wherein the network POD is configured based on an in-network collective, wherein the in-network collective comprises at least a scalable hierarchical aggregation and reduction protocol (SHARP) model in which the network POD is configured by allocating a plurality of circuits from each switch such that an aggregate count of the plurality of switches is equal to an aggregate count of distinct reductions associated with the switch, thereby ensuring full bandwidth utilization, and constructing a network topology that includes designated root switches for facilitating the reductions.

8. The method of claim 1, further comprising:

configuring a network structure with a plurality of network PODs;

determining a plurality of spine switches based on at least the plurality of network PODs;

interconnecting the plurality of network PODs via the plurality of spine switches; and triggering the execution of the LLM task using the network structure.

9. The method of claim 2, wherein the communication pattern associated with the pipeline parallelism parameter comprises at least a point-to-point communication, and wherein the communication pattern associated with the data parallelism parameter comprises at least a reduction operation.

10. A system, the system comprising:

a processing device;

a non-transitory storage device containing instructions that, when executed by the processing device, cause the processing device to:

receive a large language model (LLM) task and an input specifying information associated with execution of the LLM task, wherein the input comprises at least a data parallelism parameter, a pipeline parallelism parameter, and a communication pattern;

determine a plurality of hosts based on at least the parallelism parameter and the communication pattern;

segment the execution of the LLM task into a plurality of pipelines based on at least the data parallelism parameter;

segment each pipeline into a plurality of pipeline stages based on the pipeline parallelism parameter;

allocate the plurality of pipelines and the plurality of pipeline stages among the plurality of hosts, wherein the plurality of hosts is interconnected for data portion communication and pipeline communication;

determine a plurality of switches based on the plurality of hosts;

determine, based on the data parallelism parameter, a first set of optical circuit connections for each switch to facilitate the data portion communication between the plurality of hosts across the plurality of switches;

determine, based on the pipeline parallelism parameter, a second set of optical circuit connections for each switch to facilitate the pipeline communication between the plurality of hosts across the plurality of switches;

operatively couple the plurality of switches using the first set of optical circuit connections and the second set of optical circuit connections;

dynamically configure a network point of delivery (POD) by operatively coupling the plurality of hosts to the plurality of switches using the first set of optical circuit connections and the second set of optical circuit connections; and trigger execution of the LLM task using the network POD, wherein a count of the first set of optical circuit connections and a count of the second set of optical circuit connections is determined to satisfy a full-bisection bandwidth requirement.

11. The system of claim 10, wherein the data parallelism parameter indicates a number of pipelines for executing the LLM task, wherein each pipeline represents a data partition, wherein the pipeline parallelism parameter indicates a number of pipeline stages for each pipeline, wherein each pipeline stage represents a portion of the corresponding data partition.

12. The system of claim 10, wherein the plurality of hosts is interconnected for data portion communication and pipeline communication, wherein the data portion communication is based on the communication pattern associated with the data parallelism parameter and pipeline communication is based on the communication pattern associated with the pipeline parallelism parameter.

13. The system of claim 10, wherein, the count of the first set of optical circuit connections is greater than or equal to 2*ps*k, wherein ps is number of pipeline stages allocated to a subset of the plurality of hosts that are operatively coupled to each switch, wherein k is a fractional bandwidth requirement for each data portion communication in each direction relative to a total bandwidth of an optical circuit connection in the first set of optical circuit connections, and the count of the second set of optical circuit connections is greater than or equal to 2*p*m, wherein p is the number of pipelines allocated to the subset of the plurality of hosts that are operatively coupled to each switch, and wherein m is a fractional bandwidth requirement for each pipeline communication in each direction relative to a total bandwidth of an optical circuit connection in the second set of optical circuit connections.

14. The system of claim 10, wherein the plurality of hosts is operatively coupled to a same switch.

15. The system of claim 10, wherein the network POD is configured based on a closed loop topology to allow the plurality of hosts to communicate with one another via the plurality of switches, wherein the closed loop topology comprises at least one of a ring topology or a torus topology.

16. The system of claim 10, wherein the network POD is configured based on an in-network collective, wherein the in-network collective comprises at least a scalable hierarchical aggregation and reduction protocol (SHARP) model in which the network POD is configured by allocating a plurality of circuits from each switch such that an aggregate count of the plurality of switches is equal to an aggregate count of distinct reductions associated with the switch, thereby ensuring full bandwidth utilization, and constructing a network topology that includes designated root switches for facilitating the reductions.

17. The system of claim 10, wherein the instructions, when executed, cause the processing device to:

configure a network structure with a plurality of network PODs;

determine a plurality of spine switches based on at least the plurality of network PODs;

interconnect the plurality of network PODs via the plurality of spine switches; and trigger the execution of the LLM task using the network structure.

18. A computer program product, the computer program product comprising a non-transitory computer-readable medium comprising code configured to cause an apparatus to:

receive a large language model (LLM) task and an input specifying information associated with execution of the LLM task, wherein the input comprises at least a data parallelism parameter, a pipeline parallelism parameter, and a communication pattern;

determine a plurality of hosts based on at least the parallelism parameter and the communication pattern;

segment the execution of the LLM task into a plurality of pipelines based on at least the data parallelism parameter;

segment each pipeline into a plurality of pipeline stages based on the pipeline parallelism parameter;

allocate the plurality of pipelines and the plurality of pipeline stages among the plurality of hosts, wherein the plurality of hosts is interconnected for data portion communication and pipeline communication;

determine a plurality of switches based on the plurality of hosts;

determine, based on the data parallelism parameter, a first set of optical circuit connections for each switch to facilitate the data portion communication between the plurality of hosts across the plurality of switches;

determine, based on the pipeline parallelism parameter, a second set of optical circuit connections for each switch to facilitate the pipeline communication between the plurality of hosts across the plurality of switches;

operatively couple the plurality of switches using the first set of optical circuit connections and the second set of optical circuit connections;

dynamically configure a network point of delivery (POD) by operatively coupling the plurality of hosts to the plurality of switches using the first set of optical circuit connections and the second set of optical circuit connections; and trigger execution of the LLM task using the network POD, wherein a count of the first set of optical circuit connections and a count of the second set of optical circuit connections is determined to satisfy a full-bisection bandwidth requirement.

19. The computer program product of claim 18, wherein the data parallelism parameter indicates a number of pipelines for executing the LLM task, wherein each pipeline represents a data partition, wherein the pipeline parallelism parameter indicates a number of pipeline stages for each pipeline, wherein each pipeline stage represents a portion of the corresponding data partition.

20. The computer program product of claim 18, wherein the plurality of hosts is interconnected for data portion communication and pipeline communication, wherein the data portion communication is based on the communication pattern associated with the data parallelism parameter and pipeline communication is based on the communication pattern associated with the pipeline parallelism parameter.

21. The computer program product of claim 18, wherein, the count of the first set of optical circuit connections is greater than or equal to 2*ps*k, wherein ps is number of pipeline stages allocated to a subset of the plurality of hosts that are operatively coupled to each switch, wherein k is a fractional bandwidth requirement for each data portion communication in each direction relative to a total bandwidth of an optical circuit connection in the first set of optical circuit connections, and the count of the second set of optical circuit connections is greater than or equal to 2*p*m, wherein p is the number of pipelines allocated to the subset of the plurality of hosts that are operatively coupled to each switch, and wherein m is a fractional bandwidth requirement for each pipeline communication in each direction relative to a total bandwidth of an optical circuit connection in the second set of optical circuit connections.

22. The computer program product of claim 18, wherein the code further causes the apparatus to:

configure a network structure with a plurality of network PODs;

determine a plurality of spine switches based on at least the plurality of network PODs;

interconnect the plurality of network PODs via the plurality of spine switches; and trigger the execution of the LLM task using the network structure.

* * * * *